United States Patent
Taaffe

Patent Number: 5,313,276
Date of Patent: May 17, 1994

[54] METHOD FOR PREPARING THREE DIMENSIONAL IMAGES AND AUDIOVISUAL SYSTEM FOR DISPLAYING THEREOF

[76] Inventor: Kelly Taaffe, 1423 S. Howard Ave., Tampa, Fla. 33606

[21] Appl. No.: 882,180

[22] Filed: May 11, 1992

[51] Int. Cl.$^5$ .............................. H04N 5/64
[52] U.S. Cl. .................................. 348/51; 358/335; 348/786; 348/787
[58] Field of Search ............... 358/102, 88, 93, 254; H04N 5/64

[56] References Cited

U.S. PATENT DOCUMENTS

| | | | |
|---|---|---|---|
| 1,800,948 | 4/1931 | McHugh | 358/254 |
| 4,475,126 | 10/1984 | Akins | 358/254 |
| 4,651,219 | 3/1987 | Rickert | 358/254 |
| 4,789,907 | 12/1988 | Fischetti | 358/102 |

Primary Examiner—Howard W. Britton
Attorney, Agent, or Firm—Stroock & Stroock & Lavan

[57] ABSTRACT

An audiovisual display system for displaying three dimensional images including an image source for projecting an image in a predetermined direction. A stage contained within the audiovisual display system provides a setting for the video image. A transparent screen is disposed between the predetermined direction of the video image source and the stage and is oriented at an angle less than 90° to the line of sight and the predetermined direction so that the viewer views the stage and the video image projected onto the transparent screen so that the image appears to be positioned on the stage.

28 Claims, 5 Drawing Sheets

METHOD FOR PREPARING THREE DIMENSIONAL IMAGES AND AUDIOVISUAL SYSTEM FOR DISPLAYING THEREOF

BACKGROUND OF THE INVENTION

This invention is directed to an audiovisual display system, and more particularly to a method for producing a three dimensional image and an audiovisual display system for displaying the three dimensional image.

Audiovisual display systems are well known in the art. Among the more sophisticated audiovisual display systems are miniaturized screens used in combination with film loop projectors which display a moving image on a small portable screen providing a portable movie theater. These systems are of a fairly simple construction having an image source and a miniaturized screen and therefore are portable. Because these audiovisual display systems are capable of displaying moving pictures they have become desirable for use with demonstration videos for educational purposes and point of sale demonstration in retail stores.

These types of audiovisual display systems suffer from the disadvantage that they are limited to two dimensional displays which severely reduce the realism and aesthetic value of the information displayed. Some films are produced with a process which allows for three dimensional viewing of the film being displayed on the audiovisual display system. However, this method suffers from the disadvantage that in order to view the film as three dimensional, the viewer is required to wear special glasses which are not always readily available, are uncomfortable, or distort portions of the picture.

Another prior art approach known as the holographic process overcomes this deficiency by providing a three dimensional object which may be viewed without the use of special viewing apparatus such as glasses. Holograms operate by diffracting light from a two dimensional interference pattern recorded on a light sensitive plate or film. When light shines on the light sensitive plate, a three dimensional image is displayed. Holograms do provide greater aesthetic value and hold the attention of the viewer due to their three dimensional appearance.

Holograms suffer from several disadvantages. First, holograms provide static images and do not lend themselves to producing images of complex movement. On a more technical level the diffraction angle of the light scattered by a holographic optical element is a function of wavelength. For this reason holographic optics must be designed for operation at a particular wavelength. As a result, holographs require complicated precise machinery to produce and view an image. Additionally, if holographic optics are to focus light precisely, the light must be monochromatic. Accordingly, holograms often appear to be tinged with the one color of the monochromatic laser so that ruby lasers provide a red tinge to the hologram, detracting from the realism. Lastly, diffraction efficiency is extremely important in producing holograms because only light diffracted by the hologram is focused to a desired point. High efficiencies are not always attainable and low diffraction efficiency results in both high losses and high levels of scattered light in the wrong place. Accordingly, it is desirable to provide an audiovisual display system which overcomes the deficiencies of the prior art by producing a three dimensional image utilizing a simplified structure.

SUMMARY OF THE INVENTION

Generally speaking, in accordance with the invention, an audiovisual display system for displaying three dimensional images along a line of sight to be viewed by a viewer includes an image source for projecting a video image in a predetermined direction. A stage provides a setting for the image. A transparent screen is disposed between the predetermined direction of the video image and the stage and is oriented at an angle less than 90° to the line of sight and less than 90° from the predetermined direction so that a viewer is able to view the stage and the image projected on the transparent screen so that the image appears to be positioned on the stage to the viewer.

To record the image to be projected by the image source, the subject to be recorded is filmed against a black background. A light source is disposed in one position, above the image to be recorded. The light provides pools of light on the stage floor in the center of a camera's field of vision.

Accordingly, it is an object of the invention to provide an improved audiovisual display system.

Another object of the invention is to provide an audiovisual display system for displaying three dimensional images which allows for display of complex moving images.

A further object of the invention is to provide an improved audiovisual display system for providing three dimensional images which provides multichromatic images.

Still another object of the invention is to provide an audiovisual display system which displays life-like, animated images.

Yet another object of the invention is to provide an improved method for recording images to be displayed as a three dimensional image.

Still other objects and advantages of the invention will in part be obvious and will in part be apparent from the specification.

The invention accordingly comprises the several steps and relation of one or more of such steps with respect to each of the other, and the apparatus embodying features of construction, combinations of elements and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description, taken in connection with the accompanying drawings, in which.

DESCRIPTION OF THE PREFERRED EMBODIMENT

Figure 1:
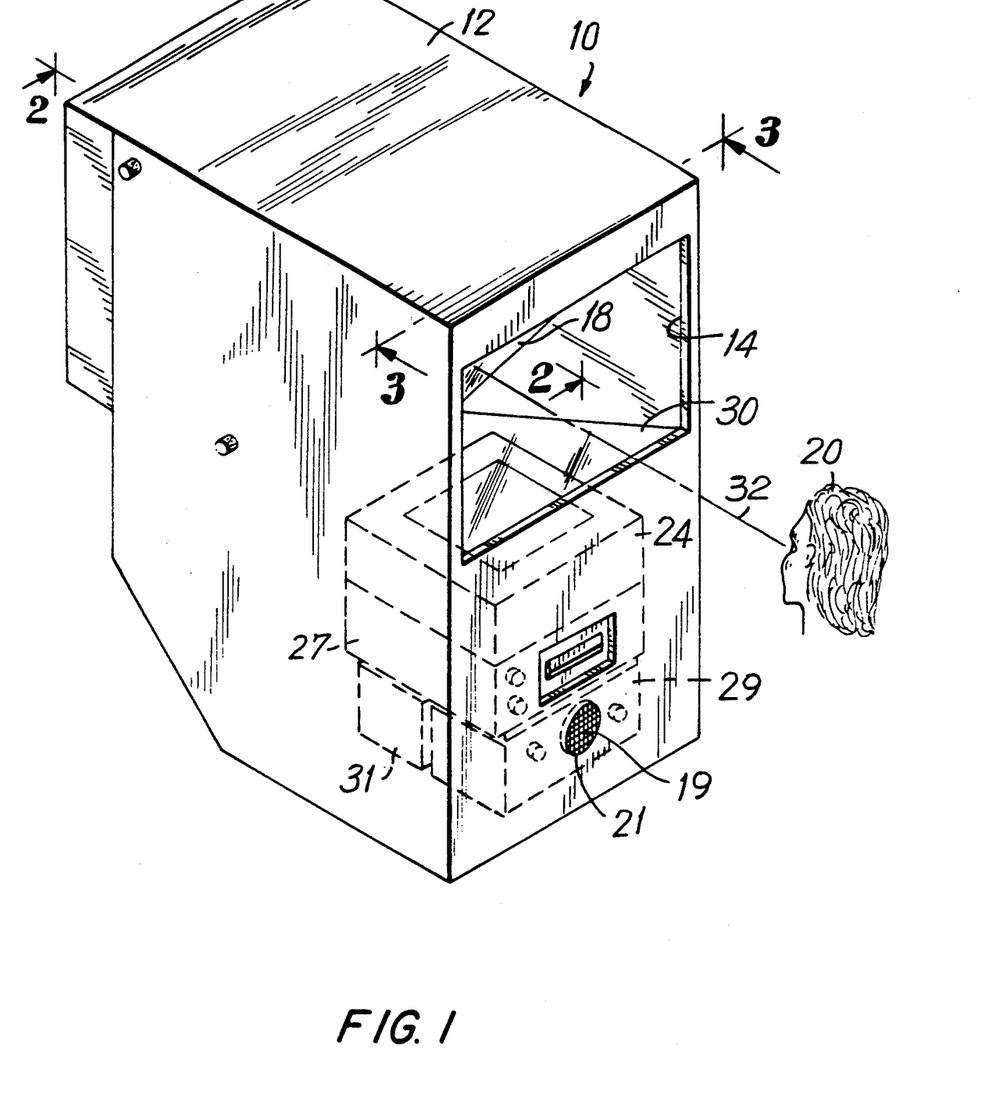
FIG. 1 is a perspective view of an audiovisual display system constructed in accordance with the invention.
Figure 2:
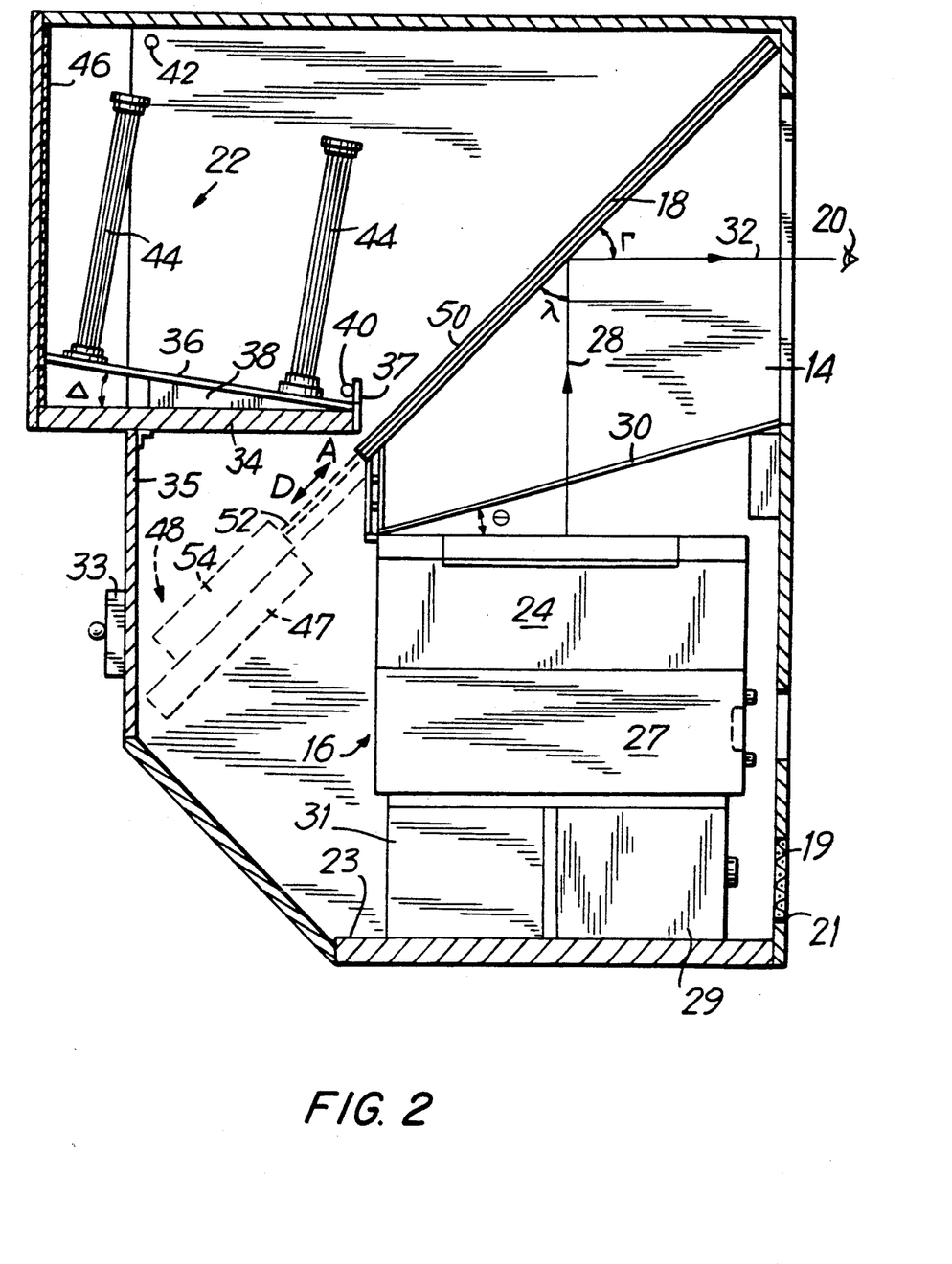
FIG. 2 is a sectional view taken along lines 2—2 of FIG. 1.
Figure 3:
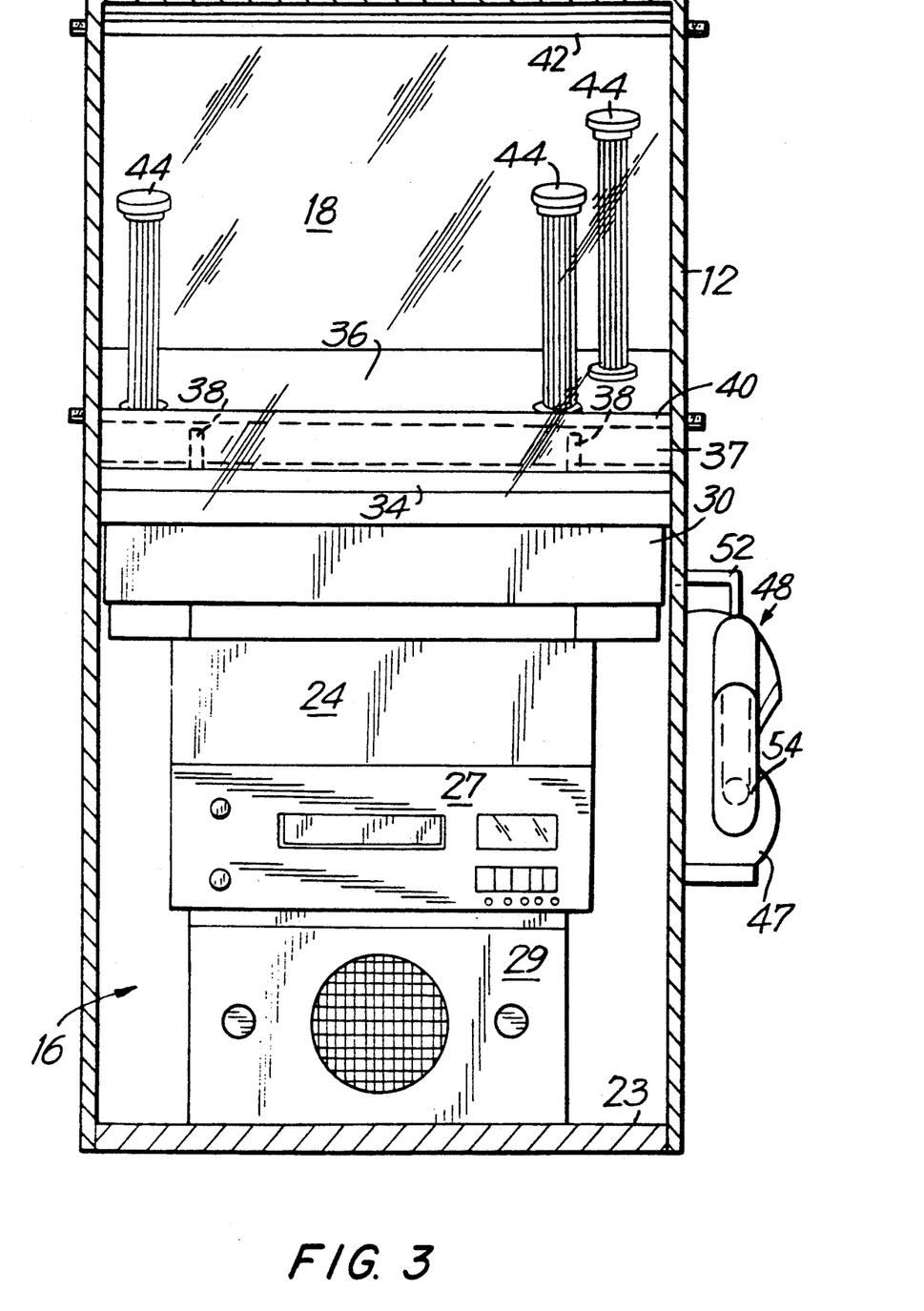
FIG. 3 is a sectional view taken along lines 3—3 of FIG. 1.

Reference is first made to FIGS. 1-3 in which an audiovisual display system, generally indicated as 10, constructed in accordance with the invention is shown. Audiovisual display system 10 includes a housing 12 having an opening 14 formed in one surface to allow a viewer 20 to view images displayed within audiovisual display system 10. Audiovisual display system 10 includes an image source generally indicated as 16 for providing an image. A transparent screen 18 is disposed within housing 12. Image source 16 projects an image onto transparent screen 18 where it is viewed by viewer 20. A display stage 22 is disposed within housing 12 so that transparent screen 18 is disposed between image source 16 and stage 22. Stage 22 is also viewed by viewer 20 through transparent screen 18 as the user simultaneously views the image projected onto transparent screen 18.

Image source 16 includes a monitor 24 supported within housing 12. Monitor 24 may be a cathode ray tube ("CRT") such as a conventional television well-known in the art, a liquid crystal display ("LCD") or the like. Monitor 24 projects a video image in a predetermined direction along a light path 28 onto transparent screen 18. A diffusion lens 30 is disposed between monitor 24 and transparent screen 18 along light pathway 28. Diffusion lens 30 is required when utilizing a CRT image source since the CRT has its own focal point. Diffusion lens 30 diffuses the light projected by the CRT altering the focal point so that lens 18 becomes the image focal point and the image projected by monitor 24 is projected onto transparent screen 18 in a manner that may be recognized and viewed by user 20. Diffusion lens 30 is disposed within housing 12 at an angle $\Theta$ relative to monitor 24. In an exemplary embodiment, $\Theta$ is 15°. If monitor 24 is an LCD monitor, then the light is polarized and a diffusion lens is not required. A control panel 17 for controlling the video image projected from monitor 24 includes control activators for horizontal hold, vertical hold, contrast and the like and is disposed between diffusion lens 30 and transparent screen allowing access to control panel 17.

Monitor 24 is seated on and electrically coupled to a video cassette recorder ("VCR") 27. VCR 27 plays video cassette tapes inserted through an opening 25 in housing 12. The video cassette tapes are recordings of the images to be projected onto transparent screen 18, so that VCR 27 provides an image signal to monitor 24 causing monitor 24 to project an image.

A speaker 29 is seated on a floor 23 of housing 12 and is electrically coupled to monitor 24. Speaker 23 produces sounds recorded on the video cassette to accompany the image projected by monitor 24. An opening 21 receiving a screen 19 is disposed adjacent speaker 29 to allow sound to exit housing 12 substantially unimpeded. A power source 31 is also seated on floor 23 and provides power to VCR 27, monitor 24, speaker 29 and low voltage lights 40, 42. Power source 31 may be either a battery source or an AC amplifier which plugs into a household wall socket.

Transparent screen 18 is disposed within housing 12 at an angle $\lambda$ relative to light path 28. By diffusing the image projected along light path 28, the image focal point becomes transparent screen 18 so that the image is projected onto transparent screen 18. In an exemplary embodiment $\lambda$ is less than 90° and preferably substantially 45°. Transparent screen 18 is also oriented by an angle $\Gamma$ relative to a line of sight 32 of viewer 20. In an exemplary embodiment $\Gamma$ is also less than 90° and preferably 45°. Transparent screen 18 is formed of a substantially transparent material such as Plexiglas or the like so that transparent screen 18 is transmissive to the light along sight line 32 and reflective to light along light path 28. Viewer 20 viewing along sight line 32 will see the image projected onto transparent screen 18 as well as through transparent screen 18 to stage 22. By viewing the image and stage 22 simultaneously, it appears to the viewer as if the image produced on transparent screen 18 is disposed on stage 22.

Stage 22 includes a stage support 34 which is substantially orthogonal with light path 28 and parallel with line of sight 32. A stage floor 36 is supported on stage support 34 by a wedge 38 so that stage floor 22 is disposed at an angle $\Delta$ relative to stage floor 34. A first low voltage light 40 is disposed on stage 22 at the level of stage floor 36 behind a light barrier 37. A second low voltage light 42 is disposed at a relatively substantial distance above stage floor 36 and is spaced both vertically and horizontally at a substantial distance from low voltage light 40. Props 44 are disposed on stage floor 36 between low voltage light 40 and low voltage light 42. A drape 46 or other back drop or the like may be provided as a backdrop to stage 22 and is disposed between low voltage light 42 and housing 12. The image will still appear to be three dimensional even in the absence of drape 46.

Housing 12 is opaque, preventing light from entering and "washing out" the image projected onto transparent screen 18. Additionally, the luminosity of low voltage lamps 40, 42 is less than the luminosity of the projected image to prevent the light of stage 22 from washing out the image. Light barrier 37 further prevents closer light 40 from washing out the image on transparent screen 18.

A linear transporter, generally indicated as 48 is provided to move a mirror 50 into place behind transparent screen 18 preventing viewer 20 from viewing through transparent screen 18 to stage 22. Linear transporter 48 mounted on a platform 47 outside of housing 12 includes a piston 52 which is slidably received within a cylinder 54. (FIG. 3) When activated, utilizing an electric motor known in the art (not shown), piston 52 is driven out of cylinder 54 moving piston 52 in a direction A. (FIG. 2) A mirror 50 affixed to piston 52 slides behind lens 18. When piston 52 is returned to cylinder 54, in the direction of arrow D mirror 50 slides down into housing 12 out of the field of view 32 of viewer 20 so that viewer 20 may again see through lens 18 to stage 22.

Housing 12 is formed with an access door 35. Door 35 is provided with a handle 33 and allows access to the components of audiovisual system 10 to make adjustments or repairs when necessary.

To determine whether an object being viewed has depth, a user keys on visual clues such as shadows, movement in front of and behind objects and the like to determine whether the object being viewed is being viewed in two dimensions or three. During operation, an image produced by monitor 24 is produced along light path 28 through diffusion lens 30 onto transparent screen 18. Viewer 20 sees the image on transparent screen 18 and because transparent screen 18 is substantially transparent, sees stage 22 as well. The positioning of low voltage lights 40 and 42 create shadows relative to props 44, drape 46 and stage floor 36. Because viewer 30 is viewing the image on transparent screen 18 and viewing the stage through transparent screen 18 it appears as if the image projected onto transparent screen 18 is on stage 22. The image and stage 22 overlap as viewed by the viewer. Because props 44 are disposed in between low voltage lights 40, 42, props 44 provide shadow and appear three dimensional to the viewer as they are three dimensional. Because the image is viewed on stage 22, the image appears to be on stage 22 and appears to be three dimensional because of the shadowing provided on stage 22. By way of example, as will be discussed in greater detail below, the image projected on transparent screen 18 may be of a dancer which interplays with columns 44 which are positioned on stage floor 36, thus giving the realism and three dimensional appearance of a dancer dancing about props 44 which are greco roman columns.

Not every viewer will provide a line of sight 32 at the same height along transparent screen 18. For example, shorter viewers 20 will view the image at a position along transparent screen 18 closer to monitor 24 while taller viewers 20 will view the image on transparent screen 18 further away from monitor 24. To ensure that for each of these varieties of viewers the image projected on transparent screen 18 appears on stage 22, stage floor 36 is tilted by an angle A towards viewer 20. This gives the illusion to taller viewers that they are sitting in a balcony viewing down at the stage while shorter viewers 20 have a view as if the viewer is on a ground level relative to the stage. In an exemplary embodiment, $\Delta$ is 7°.

In an exemplary embodiment, monitor 24 is a standard television monitor such as a CRT or LCD monitor. The image to be produced by monitor 24 is provided by a video cassette recorder, laser disc or other conventional image playback structure well known in the prior art which is electrically coupled to monitor 24. Additionally, monitor 24 being a conventional television contains integrated sound speakers (not shown) and control panels for adjusting the quality of the image projected by monitor 24. Therefore, speakers 29 may be eliminated from housing 12 to save space within housing 12. Because monitor 24 is driven by a conventional VCR 27 a further space reduction may be obtained by utilizing an external VCR coupled to monitor 24 at the point of use of audiovisual display system 10.

The image projected by monitor 24 may be either a moving or static image. For best results for the moving image, stage props 44 should be present and should have substantial height relative to stage 22. Props 44 should be positioned at least at the edge of light path 28 projected by monitor 24 to provide a point for the moving object within the image to enter and exit the field of vision for added realism of the interplay between the projected image and props 44 on stage 22.

When a television is utilized as the monitor 24, the audiovisual display system may be converted to display television signals so that the viewer 20 may conduct normal television use without the three dimensional aspects. Linear transporter 48 is caused to move mirror 50 behind transparent screen 18 blocking the viewer's line of vision 32 at transparent screen 18, preventing viewer 20 from viewing stage 22. Now, when monitor 24 projects an image only the image projected on transparent screen 18 is seen so that only the television image as projected by monitor 24 is viewed as a two dimensional image. It should be noted, that the image will be reversed due to the use of mirror 54 so that monitor 24 must be oriented within housing 12 to provide a properly oriented image for viewing.

Figure 6:
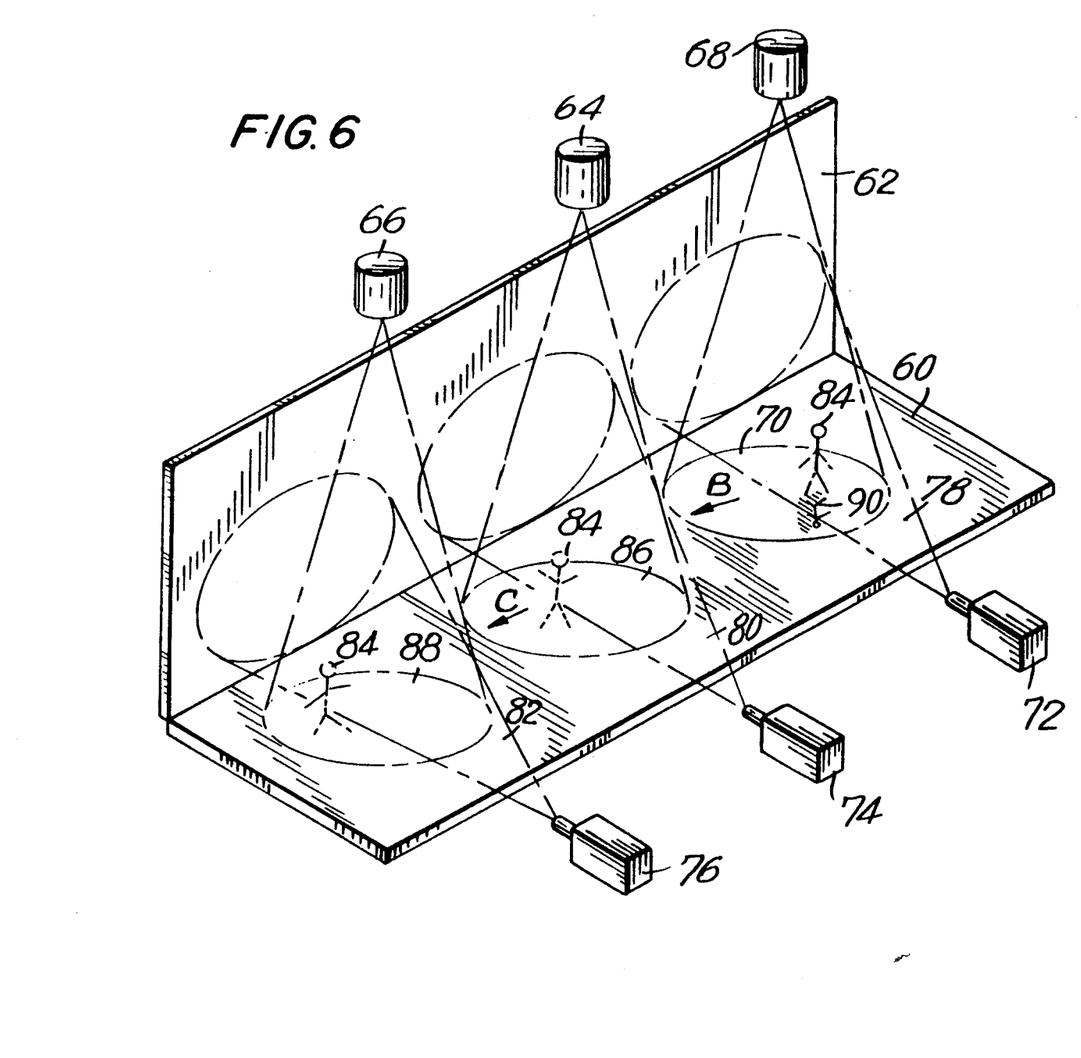
FIG. 6 is a perspective view of the apparatus for recording the images to be displayed by the audiovisual display system in accordance with the method of the invention.

Reference is now made to FIG. 6 in which perspective view of an apparatus utilized in connection with a method for recording images to be displayed by audiovisual display system 10 is shown. For ease of explanation, the example provided is the recording of a dancer. A dancer 84 performs on a performing stage 60. A video camera 72 well known in the art has a field of view 78 across a portion of stage 60. A spot light 68 is disposed above the object to be filmed to form a pool of light 70 on stage 60 substantially at the center of field of view 78. Pool of light 70 does not extend beyond field of view 78. The image to be recorded is recorded against a black background 62 which extends along the length of stage 60. An image to be recorded such as a dancer 84 moves within field of view 78. The image to be displayed on a single audiovisual display system 10 is recorded by a single camera 72. By providing a single light source above the object to be recorded shadows 90 are formed on dancer 84 and stage 60. The film of camera 72 is then converted into a video tape, stock film or a laser disc as is well known in the art and distributed for use in connection with audiovisual system 10.

Because dancer 84 is filmed with shadows, dancer 84 also has the appearance of depth when played back and the shadows appearing on stage 60, appear to be formed on stage 22 further giving the illusion of a three dimensional life-like figure. By recording dancer 84 against a black background 62, no image is recorded behind dancer 84 so that when the image of dancer 84 is formed on lens 18 all viewer 20 sees behind dancer 84 is stage 22 further heightening the three dimensional appearance of both dancer 84 and stage 22. Lastly, by moving into and out of field of view 78, and by positioning props 44 at the edges of the projected light path from monitor 24, it appears as if dancer 84 is exiting and entering the stage behind props 44 providing even more realism and a further visual cue convincing viewer 20 that he is in fact viewing a three dimensional object.

Audiovisual display system 10 may be dimensioned to be portable. In an exemplary embodiment, housing 12 has a height of about thirty-three inches, a length of substantially twenty-six inches and a width of seventeen inches making the system portable and easily usable as a point of sale display system, a portable child entertainment center or the like. However, the system may also be incorporated as a part of a fixed in-home entertainment center mounted into the wall of a room. Monitor 16 and low voltage lights 40, 42 may be powered either by AC current from a wall unit utilizing a common plug or by batteries disposed within monitor 16 or within housing 12 away from light path 28 and line of sight 32.

Figure 4:
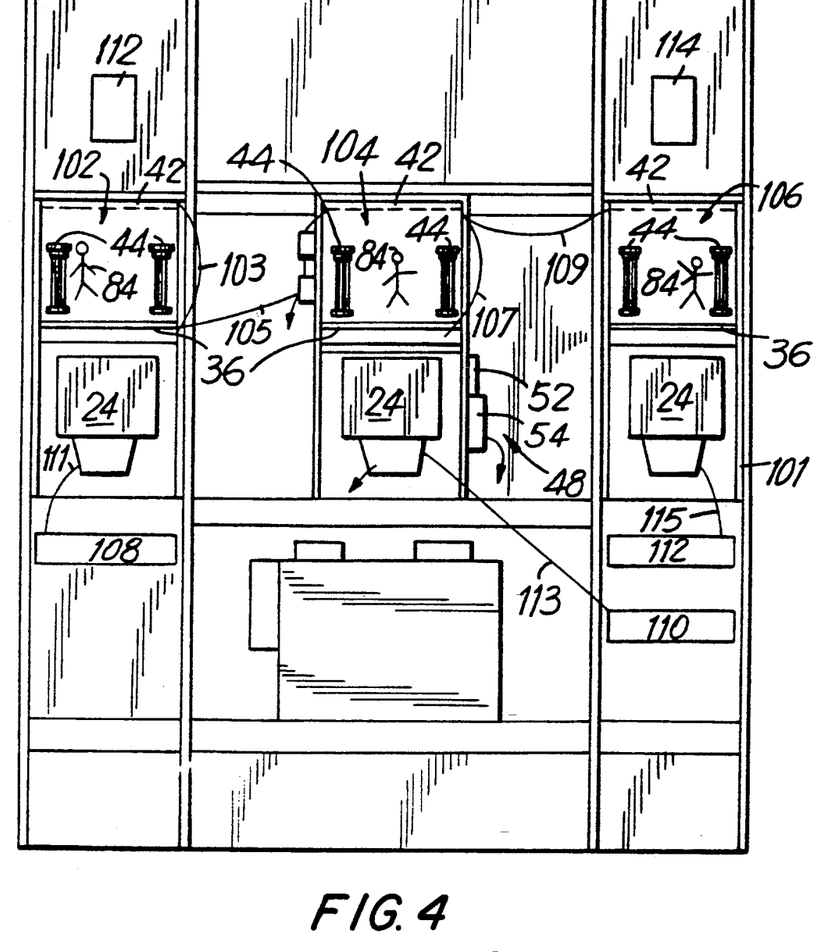
FIG. 4 is a front elevational view of a second embodiment of the audiovisual display system utilizing multiple viewing screens and multiple image sources.
Figure 5:
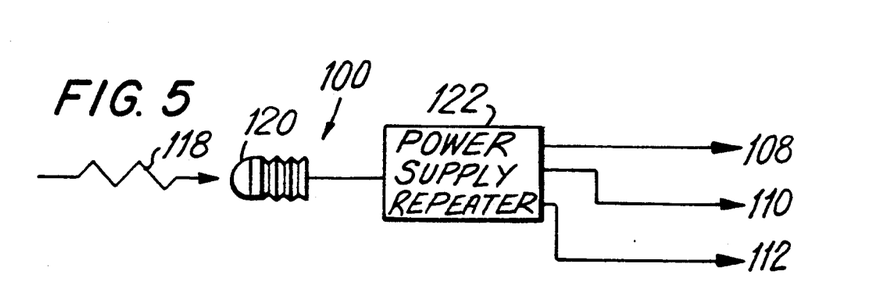
FIG. 5 is a circuit for triggering the audiovisual display system of FIG. 4.

Reference is now made to FIGS. 4 and 5 in which a sectional view of a second embodiment of an audiovisual display system generally indicated as 100 is provided. Audiovisual display system 100 is a system including three independent audiovisual units 102, 104, 106 mounted within a wall unit 101. Each audiovisual display 102, 104, 106 is identical to audiovisual display 10, the difference being that additional speakers are provided for enhanced sound and only audiovisual display unit 104 includes the linear transporter. Furthermore, to accommodate the size and shape of wall unit 101 VCRs 102, 104, 108 are electrically coupled to respective monitors 24 by wires 111, 113 and 115 but may also be removed by distance from a respective monitor. Like numerals are utilized to indicate like structures.

Each audiovisual display system includes a monitor 24, a stage 22 including a stage floor 36, a wedge 38 and a support 34 as well as a transparent screen 18, respectively. VCRs 108, 110, 112 provide an image signal to a respective audiovisual display system 102, 104, 106 for viewing of the image. Opening 14 and accordingly, lens 18 of each respective audiovisual display system 102, 104, 106 are disposed at a substantially equal height with each other so that lenses 18 of respective audiovisual display systems 102, 104, 106 form a row of lenses upon which an image may be projected and viewed. Audiovisual display system 104, the central audiovisual display system is provided with a linear transporter 48 so that the center audiovisual display system 104 may be utilized in a television viewing mode. However, this is by way of example only.

Speakers 112, 114 are provided for enhanced sound to accompany the image being projected on an individual audiovisual display system 102, 104, 106. Speakers 112, 114 are electrically coupled to monitors 24 by wires 103, 105, 107 and 109.

Audiovisual display system 100 may be utilized in several operational modes. First, because each audiovisual display system 102, 104, 106 is driven by an independent VCR 108, 110, 112 each may be operated simultaneously and independently, thus displaying an image independent of each other. For example, a visual display system 102 may display the dancer 84 dancing around columns while a coral reef may be built on stage 22 and audiovisual display system 104 may project an image of fish swimming about a coral reef while audiovisual display system 106 displays a third image. However, speakers 112, 114 would produce the sound of a preselected one of the audiovisual display systems.

In a second operational mode, television may be viewed by use of the linear transporter 48.

In a third operation mode, audiovisual systems 102, 104 and 106 may act in harmony to produce a three dimensional image which appears to travel from one audiovisual system to the other. As dancer 84 leaves one audiovisual system he enters another. By way of example, each stage 22 of audiovisual display systems 102, 104, 106 may be provided with props 44 which are greco roman columns. The image of a dancer 84 would then appear for example on transparent screen 18 of audiovisual display system 106 and dance about the stage floor 36 of audiovisual display system 106. Dancer 84 may then appear to exit stage floor 36 of audiovisual display system 106 and move to audiovisual display system 104 and appear to be dancing on stage floor 36 of audiovisual display system 104. Dancer 84 may then remain on stage floor 36 of audiovisual display system 104 or appear to return to stage floor 36 of audiovisual display system 106 or appear to continue on to stage floor 36 of audiovisual display system 102.

An image may also be provided on each transparent screen 18 of each audiovisual display system utilizing a single video tape. In this embodiment VCR 110 includes a screen splitter allowing the recorded images played by VCR 110 to be displayed on each transparent screen 18 by simultaneously providing a video signal to each monitor 24.

Reference is now made to FIG. 6 to demonstrate the method for recording such movement of the image from one audiovisual display system to another. Second and third camera 74 and 76 are provided to record an image in a respective field of view 80, 82. Optical fields of view 78, 80 and 82 do not overlap. A second spot light 64 forms a pool of light 86 within second field of view 80 which does not extend beyond field of view 80. A single light source 66 disposed above stage 60 to provide a third pool of light 88 which is on stage 60 which does not extend beyond field of view 82.

Cameras 72, 74 and 76 begin recording simultaneously. Dancer 84 is then free to dance through and within any of the three fields of view 78, 80, 82. For example, dancer 84 may first dance within first field of view 78 as discussed above. Then, dancer 84 at a later point in time may move in the direction of arrow B to second field of view 80 as shown in phantom. Camera 72 and 74 are continuously recording so it appears as if dancer 84 has left the stage with respect to camera 72 and entered the stage a short time later with respect to camera 74. Accordingly, while dancer 84 is dancing within field of view 80 an empty stage is being recorded by cameras 72 and 76. Dancer 84 may either dance within second field of view 80 or return to first field of view 78 or move on in the direction of arrow c to third field of view 82 as shown in phantom.

By utilizing such a method, a recording of an event is made for three distinct, independent fields of view which may be interrelated into an entire system. A record from each camera is produced as a video cassette, eight millimeter film, laser disc or the like. Returning to FIGS. 5 and 6, the recordings described above are formed as video cassettes. The video cassette produced by camera 76 is played in VCR 108 for audiovisual display system 102. The video cassette recorded by camera 74 is played by VCR 110 for audiovisual display system 104 and the video cassette of camera 72 is displayed by VCR 112 to be played on audiovisual display system 106.

The image displayed on the respective audiovisual display systems 102, 104, 106 correspond to the respective portions of stage 60 formed by optical field of vision 82, 80, 78, respectively. Accordingly, it will appear as if dancer 84 which in real life danced from one portion of stage 60 to another is dancing from one audio display system to another.

Cameras 72, 74 and 76 record the image before them simultaneously and continuously. Accordingly, to provide the desired effect of dancer 84 moving from audiovisual display system to audiovisual display system, VCRs 108, 110, 112 must also continuously run simultaneously. The timing of the playback of the video cassette becomes critical as realism would be lost if dancer 84 appeared simultaneously on audiovisual display system 104 and audiovisual display system 106. A circuit 100 shown in FIG. 5 includes an electronic eye 120 sensitive to infrared light. Upon receipt of an infrared PLAY or start signal 117 from a standard remote control, electronic eye 120 produces a trigger signal to a power supply repeater 122. Power supply repeater 122 produces three simultaneous trigger signals or PLAY signals which input into VCRs 108, 110, 112 to begin playing each video cassette simultaneously to ensure proper timing of the images displayed by audiovisual display systems 102, 104, 106, respectively.

Three cameras were used by way of example only. The desired effect may be obtained by using as few as two audiovisual display systems in which the character moves from one audiovisual display system to another or as in a preferred embodiment the system may include as many as fifty-two distinct audiovisual display systems acting in unison as a single system. Additionally, the desired affect may be provided without the use of the single overhead light during recording of the image or with a single light source shared by each field of view.

By providing an audiovisual display system utilizing an image source formed of off-the-shelf items such as VCRS, televisions and monitors, and projecting that image onto a substantially transparent screen oriented substantially 45° to the light path of the image source and 45° to a viewer and providing a stage behind the screen a simple apparatus for providing three dimensional images is provided. By filming a moving object which moves across the stage by dividing the stage into discrete fields of view and simultaneously recording each of those fields of view, and then playing back the recording simultaneously, on three distinct audiovisual display systems, an audiovisual display system having the illusion of a three dimensional figure moving from system to system is provided. By recording that image against a black back drop with a single light source above the image being recorded forming a pool of light within the optical field of view upon the stage, the illusion that the image is moving upon the stage of the audiovisual display systems is provided.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An audiovisual display system for displaying three dimensional images along a line of sight to be viewed by a viewer comprising image source means for projecting a video image in a predeteterminded direction; stage means for providing a setting; transparent screen means disposed between the predetermined direction of said video image and said stage means and being oriented at an angle less than 90° to said line of sight and less than 90° from the predetermined direction of said video image so that said viewer is able to view said stage means and said video image projected on said transparent screen means so that said video image appears to be positioned on said stage means to said viewer.

2. The audiovisual display system of claim 1, further comprising a video cassette recorder for providing an image signal input to said monitor.

3. The audiovisual display system of claim 1, wherein said transparent screen means is oriented at an angle of substantially 45° to said predetermined direction.

4. The audiovisual display system of claim 1, further comprising housing means for supporting said image source means, transparent screen means and stage means therein, said housing being formed of an opaque material and having an opening formed therein to allow said viewer to view said image and stage.

5. The audiovisual display system of claim 1, further comprising a mirror slidably mounted on said lens, and linear transporter means for selectively moving said mirror between a first position in said line of sight and a second position out of said line of sight.

6. The audiovisual display system of claim 1, wherein said image source means includes a monitor.

7. The audiovisual display system of claim 6, wherein said monitor is a cathode-ray tube and further comprising a diffusion lens disposed in said predetermined direction between said transparent screen means and said cathode-ray tube.

8. The audiovisual display system of claim 1, wherein said stage means includes a stage floor, said stage floor being oriented at an angle relative to said line of sight.

9. The audiovisual display system of claim 8, wherein said stage floor is oriented at an angle of substantially 7° relative to the line of sight.

10. The audiovisual display system of claim 1, wherein said stage means includes a low voltage light source oriented relative to said stage to provide shadowing on said stage.

11. The audiovisual display system of claim 10, further comprising props disposed on said stage, at least a portion of said props being disposed on said stage at a position corresponding to an edge of said image.

12. The audiovisual display system of claim 10, wherein said image is projected at a first luminosity and said lighting means provides light of a second luminosity, said second luminosity having a luminosity substantially less than the first luminosity.

13. An audiovisual display system for displaying three dimensional images along a line of sight to be viewed by a viewer comprising image source means for projecting a video image along a predetermined direction, said video image source means including a monitor; stage means for providing a setting; and transparent screen means disposed between said video image and said stage means and being oriented at an angle substantially equal to 45° to said predetermined direction allowing said viewer to view said stage means and said video image projected on said transparent screen means so that said video image appears to be positioned on said stage means to said viewer.

14. An audiovisual display system for displaying three dimensional images along a line of sight to be viewed by a viewer comprising image source means for projecting a video image in a predetermined direction, said image source means including a monitor; stage means for providing a setting; transparent screen means disposed between said predetermined direction of said video image and said stage means and being oriented at an angle substantially equal to 45° to said predetermined direction so that said viewer is able view said stage means and said video image projected on said transparent screen means so that said image appears to be positioned on said stage means to said viewer; said stage means including a low voltage light source oriented relative to said stage to provide shadowing on said stage and including a stage floor, oriented at an angle relative to said line of sight; said stage floor being oriented at an angle of substantially 7° relative to said line of sight.

15. The audiovisual display system of claim 14, further comprising a mirror slidably mounted on said transparent screen means, and linear transporter means for selectively moving said mirror between a first position in said line of sight and a second position out of said line of sight.

16. An audiovisual display system for displaying three dimensional images to be viewed by a viewer along a line of sight, said system comprising a first image source means for projecting a video image along a first predetermined direction; a first stage means providing a setting; a first transparent screen means disposed between said first predetermined direction of said video image and said first stage means and being oriented at an angle less than 90° to said line of sight and said first predetermined direction so that said viewer is able to view said first stage means and said first video image projected on said first transparent screen means so that said first video image appears to be positioned on said first stage means; a second image source means for projecting a second video image along a second predetermined direction, a second stage means providing a setting; a second transparent screen means disposed between said second predetermined direction of said second video image and said second stage means and being oriented at an angle less than 90° to said line of sight and second predetermined direction so that said viewer views said second stage means and said second video image projected on said second transparent screen means so that said second video image appears to be positioned on said second stage means, said second transparent screen means being positioned adjacent said first transparent screen means forming a row of said transparent screen means, and control means for causing said first image source means to project said video image along said first predetermined direction simultaneously with said second source means projecting said second video image along said second predetermined direction.

17. The audiovisual display system of claim 16, wherein said first image includes a first moving objected, said moving object appearing to move onto said first stage means and off of said first stage means, and said second image includes an image of a second moving object, said second moving object appearing to move onto said second stage means and off of said second stage means, said first moving object appearing to be on said first stage when said second moving object appears to be off of said stage and said second moving object appearing to move onto said second stage when said first moving object appears to move off of said first stage.

18. A method for recording an image to be displayed on an audiovisual display system for displaying three dimensional images along a line of sight to be viewed by a viewer, said system having an image source means for projecting an image along a light path, a display stage means providing a setting for said image and transparent screen means disposed between said image source means and said display stage the image being of a moving object on a performing stage, the method comprising the steps of providing a light source above said performing stage, forming a pool of light on said performing stage within a field of view, providing a black back drop across said field of view behind said object and filming said object within said field of view.

19. The method of claim 18, further comprising the step of moving said object about said field of view and selectively moving said object out of said field of view and into said field of view.

20. A method for recording an image to be displayed on an audiovisual display system for displaying three dimensional images to be viewed by a viewer along a line of sight, said system including a first image source means for projecting a first image along a first light path, a first stage means providing a setting for said first image and a first transparent screen means disposed between said first image source and said first stage means along said first light path allowing said viewer to view said first stage means and allowing said first image to be projected on said first transparent screen means so that said image appears to be positioned on said first stage means, a second image source means for projecting a second image along a second light path, a second stage means providing a setting for said second image, a second transparent screen means disposed between said second image source means and second stage means along said line of sight and said second light path allowing said viewer to view said second stage means and allowing said second image to be projected onto said transparent screen means so that said second image appears to be positioned on said second stage means, the image being of a moving object on a performing stage, the method comprising the steps of providing a first light source above a first portion of said performing stage forming a first pool of light on said performing stage within a first field of view, providing a second light source above a second portion of said performing stage forming a second pool of light on said performing stage within a second field of view, said second field of view not overlapping said first field of view, providing a black back drop extending across said first field of view and said second field of view, filming said first field of view with a first camera and simultaneously filming said second field of view with a second camera.

21. The method of claim 20, further comprising the step of moving said object about said first field of view and selectively moving said object from said first field of view to said second field of view and selectively returning said object from said second field of view to said first field of view.

22. An audiovisual display system for displaying a video image recorded on a performing stage beneath a single light source forming a pool of light within a field of view of a camera and recorded against a black back drop, said system displaying said image as a three dimensional image along a line of sight to be viewed by the viewer, said audiovisual display system comprising image source means for projecting a video image along a predetermined direction; display stage means for providing a setting; and transparent screen means disposed between said predetermined direction and said display stage means and being oriented at an angle less than 90° to said line of sight and said predetermined direction allowing said viewer to view said display stage means and said image projected on said transparent screen means so that said image appears to be positioned on said display stage means.

23. The audiovisual display system of claim 22, wherein said image source means includes a monitor.

24. The audiovisual display system of claim 22, wherein said transparent screen means is oriented at an angle of substantially 45° to said light path.

25. The audiovisual display system of claim 22, wherein said display stage means includes a stage floor, said stage floor being oriented at an angle relative to said line of sight.

26. The audiovisual display system of claim 22, wherein said display stage means includes a low voltage light source oriented relative to said display stage means to provide shadowing on said stage.

27. The audiovisual display system of claim 26, further comprising props disposed on said display stage means, at least a portion of said props being disposed on said display stage means at a position corresponding to an edge of said image.

28. The audiovisual display system of claim 26, wherein said image is projected at a first luminosity and said lighting means provides light of a second luminosity, said second luminosity having a luminosity substantially less than the first luminosity.

* * * * *